(12) United States Patent
McElroy

(10) Patent No.: US 6,977,119 B2
(45) Date of Patent: Dec. 20, 2005

(54) FUEL CELL TRANSIENT CONTROL SCHEME

(75) Inventor: James F. McElroy, Suffield, CT (US)

(73) Assignee: Plug Power Inc., Latham, NY (US)

( * ) Notice: Subject to any disclaimer, the term of this patent is extended or adjusted under 35 U.S.C. 154(b) by 409 days.

(21) Appl. No.: 10/121,267

(22) Filed: Apr. 12, 2002

(65) Prior Publication Data

US 2003/0022043 A1    Jan. 30, 2003

Related U.S. Application Data

(60) Provisional application No. 60/287,044, filed on Apr. 27, 2001.

(51) Int. Cl.[7] .................................................. H01M 8/00
(52) U.S. Cl. ........................... 429/13; 429/17; 429/19; 429/22; 429/23; 429/25
(58) Field of Search .............................. 429/13, 22, 23, 429/25, 17, 19

(56) References Cited

U.S. PATENT DOCUMENTS

| | | | | |
|---|---|---|---|---|
| 4,741,978 A | 5/1988 | Takabayashi | ................ | 429/23 |
| 5,290,641 A | 3/1994 | Harashima | ................ | 429/17 |
| 5,432,710 A | 7/1995 | Ishimaru et al. | ............. | 364/493 |
| 5,804,894 A | 9/1998 | Leeson et al. | ................ | 307/130 |
| 5,991,670 A | 11/1999 | Mufford et al. | ................ | 701/22 |
| 6,326,763 B1 | 12/2001 | King et al. | .................. | 320/101 |
| 6,393,354 B1 | 5/2002 | Scheffler et al. | .............. | 701/99 |
| 6,428,917 B1 | 8/2002 | Lacy et al. | .................... | 429/13 |
| 6,461,751 B1 | 10/2002 | Boehm et al. | ................ | 429/12 |
| 6,581,015 B2 * | 6/2003 | Jones et al. | .................... | 702/60 |
| 6,586,123 B1 * | 7/2003 | Yi et al. | ........................ | 429/13 |
| 6,697,745 B2 * | 2/2004 | Jones et al. | .................. | 702/60 |
| 6,761,987 B2 * | 7/2004 | Marvin et al. | ................ | 429/13 |
| 2002/0001745 A1 | 1/2002 | Garstein et al. | .............. | 429/61 |
| 2002/0021109 A1 | 2/2002 | Marvin et al. | .............. | 320/134 |

* cited by examiner

Primary Examiner—Bruce F. Bell
(74) Attorney, Agent, or Firm—Trop, Pruner & Hu, P.C.

(57) ABSTRACT

The invention provides a fuel cell system, including a fuel cell having an anode chamber and a cathode chamber, wherein the anode chamber is in fluid communication with a hydrogen reservoir, and wherein the cathode chamber has an inlet and an outlet. The cathode chamber comprises non-intersecting flow channels, and the non-intersecting flow channels provide fluid communication between the cathode inlet and outlet. The fuel cell has a first connection to an electrical load, wherein the first connection comprises a first diode adapted to prevent current flow to the fuel cell. A blower is in fluid communication with the cathode inlet. The blower has an electronic connection to a controller, and the blower is adapted to vary a flow of oxygen through the cathode chamber according to a control signal received from the controller. The system includes a battery having a second connection to the electrical load, the second connection being in parallel with the first connection of the fuel cell to the load, and the second connection comprising a second diode adapted to prevent current flow to the battery. The controller maintains the flow of oxygen such that an output power capacity of the fuel cell is limited by the amount of oxygen flowed through the fuel cell.

20 Claims, 1 Drawing Sheet

FUEL CELL TRANSIENT CONTROL SCHEME

CROSS REFERENCE TO RELATED APPLICATIONS

This application claims priority under 35 USC 119(e) from U.S. Provisional Application No. 60/287,044, filed Apr. 27, 2001, naming McElroy as inventor, and titled "FUEL CELL TRANSIENT CONTROL SCHEME." That application is incorporated herein by reference in its entirety and for all purposes.

BACKGROUND

The invention generally relates to a system and control algorithm for accommodating load increases on fuel cell systems.

A fuel cell is an electrochemical device that converts chemical energy produced by a reaction directly into electrical energy. For example, one type of fuel cell includes a proton exchange membrane (PEM), often called a polymer electrolyte membrane, that permits only protons to pass between an anode and a cathode of the fuel cell. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

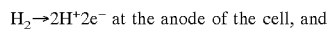
$H_2 \rightarrow 2H^+ 2e^-$ at the anode of the cell, and

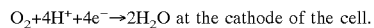
$O_2 + 4H^+ + 4e^- \rightarrow 2H_2O$ at the cathode of the cell.

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide a larger amount of power.

The fuel cell stack may include flow plates (graphite composite or metal plates, as examples) that are stacked one on top of the other. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells.

The fuel cell stack may be part of a fuel cell stack system that supplies electrical power to an electrical load. For example, for a residential fuel cell system, the electrical load may be established by the various power consuming devices of a house. To furnish AC power to the house, the fuel cell system typically converts the DC voltage that is provided by the fuel cell stack into AC voltages.

Because the power that is demanded by the devices of the house may vary, the fuel cell system may control the rate at which the above-described electrochemical reactions occur for purposes of regulating the efficiency of the fuel cell stack. In this manner, the fuel cell system may include a fuel processor to convert a hydrocarbon (natural gas or propane, as examples) into a reformate that contains the hydrogen gas. The rate at which the fuel processor produces the hydrogen gas flow needs to be large enough to satisfy the stoichiometry that is dictated by the above-described equation. A larger power demand from the house typically requires a larger flow rate and thus, requires a higher rate of hydrogen production by the fuel processor.

A conventional fuel processor may have a relatively slow transient response that causes any increase in Its rate of hydrogen production to significantly lag the increased demand for power. As a result, when the power that is demanded by the house suddenly increases, the cell voltages of the fuel cell stack may significantly decrease due to the lack of a sufficient hydrogen gas flow until the rate of hydrogen production by the fuel processor increases to the appropriate level. Due to the delayed response of the fuel processor, it is possible that the fuel cell stack may be damaged. For example, if an electrical load is placed on a fuel cell that is not adequately supplied with hydrogen, the cell can go from generating power to itself being an electrical load as water at the anode is electrolyzed to supply the protons passing through the membrane. In such a case, a negative voltage arises across the cell (the cell "goes negative") This mode of operation in fuel cells has been known to irreparably damage the performance of such cells. Yet another problem arising from such a scenario is that the fuel cell is temporarily unable to meet the transient power demand.

There is a continuing need for control algorithms for integrated fuel cell systems designed to achieve objectives including the forgoing in a robust, cost-effective manner.

SUMMARY

In general, the invention applies discoveries and know-how relating to fuel cell transient load response. In particular, in one aspect, the supply of fuel cell reactants are stoichiometrically regulated such that oxygen supply is always the limiting factor in power output. In a related aspect, the fuel cell cathode flow channels are non-intersecting to prevent any hydrogen that may diffuse or be pumped into the oxygen-starved channel from contacting oxygen still present in another channel in the presence of the fuel cell catalyst, a condition which can potentially damage the fuel cell and cause safety concerns. It has been discovered that fuel cell systems under the present invention are not appreciably damaged by oxygen starvation under electrical load. This concept is in turn coupled with the application of a diode-protected power delivery scheme that is less expensive and offers improved performance and reliability over certain prior art systems designed to regulate fuel cell power output with more sophisticated circuitry according to reactant availability.

In one aspect, the invention provides a fuel cell system, including a fuel cell having an anode chamber and a cathode chamber, wherein the anode chamber is in fluid communication with a hydrogen reservoir, and wherein the cathode chamber has an inlet and an outlet. The cathode chamber comprises non-intersecting flow channels, and the non-intersecting flow channels provide fluid communication between the cathode inlet and outlet. The fuel cell has a first connection to an electrical load, wherein the first connection comprises a first diode adapted to prevent current flow to the fuel cell. A blower is in fluid communication with the cathode inlet. The blower has an electronic connection to a controller, and the blower is adapted to vary a flow of oxygen through the cathode chamber according to a control signal received from the controller. The system includes a battery having a second connection to the electrical load, the second connection being in parallel with the first connection of the fuel cell to the load, and the second connection comprising a second diode adapted to prevent current flow to the battery. The controller maintains the flow of oxygen such that an output power capacity of the fuel cell is limited by the amount of oxygen flowed through the fuel cell.

In additional embodiments, systems under the present invention may also include any of the following features, either alone or in combination. The fuel cell can comprise a dead-headed anode and a flow-through cathode. In the context of this invention, a dead-headed anode refers to a system wherein the anode chamber is exposed to a pressurized fuel source (e.g., a hydrogen tank or pressure bottle). A dead-headed system does not flow the hydrogen through the fuel cell, rather, hydrogen is replenished by diffusion as it reacts. Dead-headed systems typically include a vent that is periodically used to purge the anode chamber to remove inert components such as nitrogen that can accumulate in the anode chamber and effectively block the replenishing diffusion of hydrogen in the anode chamber. Such systems are well known in the art, such as the systems typically used in extraterrestrial applications. By contrast, a flow-through cathode refers to a cathode wherein the oxidant (e.g., air or pure oxygen) is continually flowed through the cathode chamber, for example by a blower.

The fuel cell can comprise a polymer electrolyte membrane having an operating temperature in the range 20–200° C. (e.g., 20–100° C. or 120–200° C.). The hydrogen reservoir can comprise at least 90 wt % hydrogen, and herein the flow of oxygen comprises air. Where the anode chamber has an inlet and an outlet, the inlet and outlet can be in fluid communication. Such systems are typically referred to as recirculation systems (e.g., anode recirculation in this case). The hydrogen reservoir can comprise a pressure regulator valve adapted to maintain a predetermined pressure of the reservoir.

In another aspect, the invention includes a method of operating a fuel cell system, including the following steps: connecting a fuel cell to an electrical load through a first diode adapted to prevent current back-flow to the fuel cell; connecting a battery to the electrical load through a second diode adapted to prevent current back-flow to the battery; providing the fuel cell with a first stoichiometric excess of hydrogen with respect to a stoichiometric hydrogen requirement of the electrical load; and providing the fuel cell with a second stoichiometric excess of oxygen with respect to a stoichiometric oxygen requirement of the electrical load, wherein the second stoichiometric excess of oxygen is less that the first stoichiometric excess of hydrogen.

Further embodiments can include any of the following features and additional steps, either alone or in combination: maintaining an operating temperature of the fuel cell at a temperature in the range 20–100° C.; maintaining an operating temperature of the fuel cell at a temperature in the range 120–200° C.; dead-heading an anode chamber of the fuel cell, and circulating air through the a cathode of the fuel cell; exhausting hydrogen from the fuel cell anode chamber, and recirculating a portion (e.g., 100%) of the exhausted hydrogen to an inlet of the anode chamber; varying a blower output according to a control signal to blow air through a cathode chamber of the fuel cell to provide the second stoichiometric excess of oxygen; measuring a voltage of the fuel cell, and varying the control signal to increase the blower output when the fuel cell voltage falls below a predetermined threshold; and measuring an oxygen content of a cathode exhaust stream, and varying the control signal to increase the blower output when the oxygen content falls below a predetermined threshold.

In another aspect, the invention includes a method of transient load response for a fuel cell system, comprising the following steps: connecting a fuel cell to an electrical load through a first diode adapted to prevent current back-flow to the fuel cell; connecting a battery to the electrical load through a second diode adapted to prevent current back-flow to the battery; providing the fuel cell with an amount of hydrogen, the amount of hydrogen having a first stoichiometric excess over a hydrogen requirement of the electrical load; operating a blower to supply the fuel cell with a flow of oxygen, the amount of oxygen having a second stoichiometric excess over an oxygen requirement of the electrical load; applying a transient load increase to the fuel cell; increasing the flow of oxygen during a response lag period; starving the fuel cell of oxygen during the response lag period; and supplying power from the battery to the electrical load during the response lag period.

In some embodiments, the fuel cell can comprise a dead-headed anode and a flow-through cathode. Other embodiments may also include any of the following steps, either alone or in combination: exhausting hydrogen from the fuel cell anode chamber, and recirculating a portion of the exhausted hydrogen to an inlet of the anode chamber; measuring a voltage of the fuel cell, and increasing the flow of oxygen during the response lag period when the fuel cell voltage falls below a predetermined threshold; and measuring an oxygen content of a cathode exhaust stream, and increasing the flow of oxygen during the response lag period when the oxygen content falls below a predetermined threshold.

It will be appreciated that methods under the invention may apply to systems including any of the aforementioned features, either alone or in combination. Advantages and other features of the invention will become apparent from the following description, drawing and claims.

DETAILED DESCRIPTION

Figure 1:
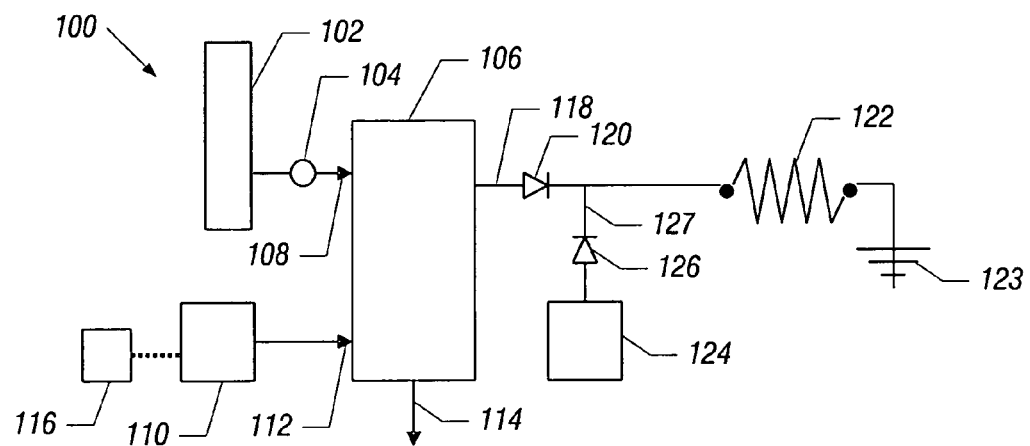
FIG. 1 shows a schematic diagram of a fuel cell system according to an embodiment of the invention.

In general, there are three major ways that hydrogen fuel cells are operated. Firsts the hydrogen can be flowed through the fuel cell and any unreacted hydrogen can be vented from the fuel cell. Second, the fuel cell can be provided with a given amount of hydrogen in a closed loop, and oxygen can be supplied as needed to supply enough power to meet an electrical load. For example, the fuel cell can be exposed to a pressurized hydrogen source. In such systems where air is used as the oxidant, inert nitrogen in the air can diffuse across the membrane into the anode side and dilute the hydrogen supply in the anode flow channels (also referred to as the anode chambers). For this reason, the anode chambers of such systems are typically vented periodically to maintain a satisfactory hydrogen concentration at the anode. Third, hydrogen can be circulated through the fuel cell in a closed loop so that any inert gasses that may diffuse into the anode stream (e.g., nitrogen in the previous example) do not reduce the anode chamber hydrogen concentration below a desired level. For example, the fuel cell can be exposed to a pressurized hydrogen source, and the hydrogen within this closed loop can be circulated by a blower so that the concentration of any inert materials that diffuse into the fuel supply will be more uniform throughout the fuel supply, and not be concentrated in the anode chamber. Any of these methods may be used with the present invention.

In fuel cell systems utilizing air as the oxidant reactant, the air can have its flow controlled by a blower. As an example, as the electricity demand on the fuel cell changes, the electrical input to the blower can be modulated to provide a rapid oxidant reactant control response. Additionally, a degree of excess air flow may be used to improve fuel cell performance (e.g., 2.0 stoich). Still, the air flow must not be too much in excess of that required of the fuel cell reactions, since an excess of electrical energy will be used to power the air blower and will lower the system efficiency. Additionally, if the PEM fuel cell is based on a hydrated membrane (e.g., sulfonated flourocarbon polymers), the fuel cell can be damaged if it is dried out by a subsaturated reactant stream. Thus, with such systems any excess air flow must not be so high as to remove enough water from the fuel cell to cause the membrane to dry. Hydrated PEM systems are typically operated in a temperature range from 20–100° C. (e.g., 55–80° C.). With no CO in the hydrogen, the performance of such cells may be adequate at room temperature. Such cells may also be operated as high as 120° C. or higher if the reactants are pressurized (e.g., 3 atmospheres).

Other PEM materials are also suitable such the polybenzimidazole (PBI) material available from Celanese. The PBI PEM does not require humidification and is not susceptible to the dry-out issues described above. Systems incorporating the PBI PEM material are typically operated in a temperature range from 120–200° C.

In a pure hydrogen/air system the pure hydrogen can have its flow control into the fuel cell stack with a back pressure gas regulator that sets the hydrogen pressure to the stack. In such systems, air is typically flowed through the cathode chambers of the fuel cell, while the hydrogen anode is maintained at a pressure maintained by the pressure regulator. The electrical load on the fuel cell determines the amount of hydrogen that is utilized, and the regulator valve simply opens and closes to maintain the hydrogen pressure in the anode chamber. With this arrangement, as in a system utilizing pure hydrogen and pure oxygen, sufficient hydrogen is available at all times to accept any increasing electricity load demand within the maximum fuel cell rating. In such a system, the maximum fuel cell rating refers to the maximum power output that can be achieved with a given pressure of hydrogen and a sufficent supply of oxygen to react the hydrogen required.

One difference between a system utilizing pure hydrogen and pure oxygen from a system utilizing pure hydrogen and air is that nitrogen tends to diffuse into the anode from the air cathode and this condition must be accommodated since it dilutes the amount of hydrogen available to meet a given electrical demand. Such nitrogen diffusion generally has a rate that is independent from the electrical load on the fuel cell. As previously mentioned, such diffusion can be accommodated by periodic purging of the anode or by circulation of the fuel gas within the stack.

To accommodate transient increases in electrical load demands and peak electrical load demands greater than the rating of the fuel cell, a battery may be used in parallel with the fuel cell. In a dead-headed hydrogen/flow-through air system, the battery assures that the electrical load demand is met while the fuel cell air flow is being modulated during increases in electrical load and during peak electrical load demand requirements in excess of the fuel cell capability.

One advantage the invention provides is a simple means of controlling the current from the fuel cell and the battery during increasing electricity load demands. What has been shown to work and is the subject of this invention goes against the common wisdom that PEM fuel cells should never be allowed to operate at a negative voltage. In a typical fuel cell system, if an electrical load is placed on a cell and the cell is not provided with enough hydrogen that can be reacted to supply the load, the voltage of the cell can decrease to the point where the polarity reverses (the cell is "driven negative"). Driving cells negative can result in irreparable damage to the electrodes. For this reason, some fuel cell systems incorporate circuitry that controls the amount of load that can be placed on the fuel cell stack, to prevent any of the cells from being damaged where the load increases beyond the available fuel. For example, the teachings of U.S. Pat. No. 09/471,759 are hereby incorporated by reference.

In one possible embodiment of the present invention, a diode-protected battery may be connected to an electrical load in parallel with a PEM fuel cell (or stack). The PEM fuel cell (or stack) and the battery system are both connected to a diode on their way to the electrical load. As an example of a suitable diode-connected battery system, the teachings of U.S. Pat. No. 09/540,690 are hereby incorporated by reference. It will be appreciated that under such an arrangement, the PEM fuel cell, normally having a higher voltage than the battery system, delivers all of the power required by the load except when the PEM fuel cell voltage falls to the battery float voltage. At this point the battery and the PEM fuel cell share the electrical load according to their respective steady state polarizations. If the PEM fuel cell voltage is driven below that of the battery system, the load is supplied by the battery system Under steady state conditions, sufficient air is supplied to a PEM fuel cell stack to assure all cells have ample oxygen to support the current demand. In such condition, all of the cells will typically have essentially the same positive voltage.

For a system utilizing pressurized hydrogen and flowed air, during an increase in electrical load demand, the PEM fuel cell is limited in its ability to respond by the aforementioned time lag in the air flow from the blower. If the load current change is greater than that allowed by the amount of excess air flow, the PEM fuel cell voltage (e.g., as represented on a voltage v. current "polarization" curve) will temporarily fall (to nearly a vertical downward slope with respect to time) until it reaches the battery float voltage. At this point the battery is producing part of the electrical current and the air blower is signaled to increase the air flow rate. Within a few seconds the air flow is at its nominal excess flow condition and full PEM fuel cell steady state polarization (i.e., the nominal ratio for a fuel cell under load between voltage and current) has been recovered.

The aforementioned example is a simple method of controlling the PEM fuel cell and battery currents. However, the success of this method depends on the ability of individual cells within the stack to operate at negative voltages without compromising life and reliability, since in such systems, cell voltages are typically driven negative during the response lag in air supply.

When a PEM fuel cell stack of multiple cells is oxygen deprived, one or more of the individual cells will be driven negative and thus become an electrical load to the rest of the stack. Generally, certain cells will be driven negative first because perfect flow distribution among the cells is usually not present. Since the current is constant throughout the stack, the oxygen deprived cells will not have sufficient oxygen to react with the continued flow of protons. Without wishing to be bound by theory, this typically results in the discharge of pure hydrogen gas from the anode chamber to the cathode chamber.

Whereas it might damage a PEM fuel cell to be driven negative from hydrogen starvation (e.g., because of the reactions that occur in the anode gas environment at the negative potentials), it has been discovered that driving a cell negative from oxygen starvation will not result in such damage (e.g., the cathode gas environment does not produce the same damaging reactions at the negative potentials).

Referring to FIG. 1, a schematic diagram is shown of a fuel cell system 100 according to an embodiment of the invention. A hydrogen reservoir 102, such as a pressurized hydrogen cylinder (e.g., pure hydrogen, or substantially pure hydrogen such as at least 90% pure) is connected to an anode chamber (not shown) of a fuel cell through anode inlet 108. In this example, the anode chamber is dead-headed. The hydrogen reservoir 102 has a pressure greater than a pressure of the anode chamber, such that hydrogen tends to flow from the reservoir 102 to the fuel cell as the hydrogen is reacted. The pressure of the hydrogen in the anode chamber is regulated and maintained by pressure regulator 104 Pressure regulator 104 can be a conventional valve and spring arrangement, or can also be a valve actuated by a control signal (e.g., a system with electronically variable fuel inlet pressure). Oxygen (e.g., air) is injected through a cathode chamber (not shown) of the fuel cell through cathode inlet 112 and out cathode outlet 114. The oxygen is flowed via blower 110, and the output of the blower 110 is responsive to controller 116, which is connected to the blower.

The power output of the fuel cell stack 106 is connected to an electrical load 122 (grounded at 123) via electrical connection 118. A battery 124 is also connected to the electrical load 122, via electrical connection 127 that is in parallel with electrical connection 118. As an example, the battery can be a 12V conventional lead-acid battery. Other battery systems are also suitable (e.g., other types of batteries, batteries in series or parallel, etc.). A first diode 120 is placed along electrical connection 118 between the fuel cell stack 106 and the intersection of the battery connection 127. Likewise, a second diode 126 is placed along electrical connection 127 between the battery 124 and the intersection of the stack connection 118.

For illustrative purposes, it is assumed that the battery system 124 has a voltage of 48V and the stack 106 has 60 fuel cells such that the stack operating voltage is generally over 48 volts. The blower 110 is limited in how fast it can respond to an increase in load 122. For example, a transient load increase may result in oxygen starvation during the response lag period where the blower speed is increased to provide more oxygen. As the stack 106 becomes oxygen starved under electrical load 122, the stack voltage will drop. While the stack voltage is over 48 volts, the stack will provide the current to the load 122. The second diode 126 passively prevents back-flow of current to the battery 124. When the stack voltage reaches 48V, the load 122 is shared by the battery 124 and the stack 106. As the stack voltage is driven lower than 48V (e.g., instantaneously on a transient spike in load 122), the load 122 is supplied entirely by battery 124. At this point, the first diode 120 passively prevents current from flowing to the stack 106.

Figure 2:
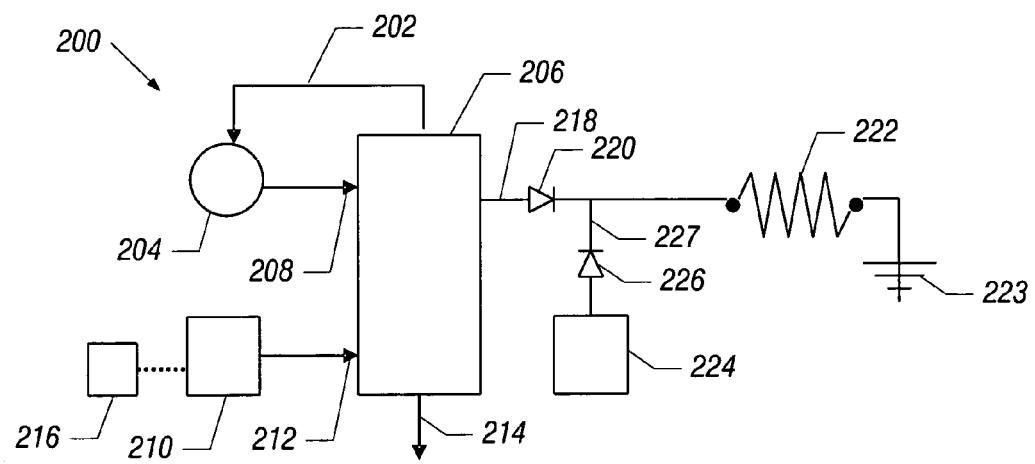
FIG. 2 shows a schematic diagram of a fuel cell system according to an embodiment of the invention.

FIG. 2 shows a schematic diagram of a fuel cell system 200 according to an embodiment of the invention. This example is similar to the system 100 shown in FIG. 1 except that the hydrogen is supplied to the fuel cell stack 206 via a hydrogen recirculation pump 204 via conduit 202. The hydrogen enters the anode chamber (not shown) of a fuel cell through anode inlet 208. The hydrogen reservoir 202 has a pressure greater than a pressure of the anode chamber, such that hydrogen tends to flow from the reservoir 202 to the fuel cell as the hydrogen is reacted. The pressure of the hydrogen in the anode chamber is regulated and maintained by pressure regulator 204. Pressure regulator 204 can be a conventional valve and spring arrangement, or can also be a valve actuated by a control signal (e.g., a system with electronically variable fuel inlet pressure). Oxygen (e.g., air) is injected through a cathode chamber (not shown) of the fuel cell through cathode inlet 212 and out cathode outlet 214. The oxygen is flowed via blower 210, and the output of the blower 210 is responsive to controller 216, which is connected to the blower.

The power output of the fuel cell stack 206 is connected to an electrical load 222 (grounded at 223) via electrical connection 218. A battery 224 is also connected to the electrical load 222, via electrical connection 227 that is in parallel with electrical connection 218. As an example, the battery can be a 22V conventional lead-acid battery. Other battery systems are also suitable (e.g., other types of batteries, batteries in series or parallel, etc.). A first diode 220 is placed along electrical connection 218 between the fuel cell stack 206 and the intersection of the battery connection 227. Likewise, a second diode 226 is placed along electrical connection 227 between the battery 224 and the intersection of the stack connection 218.

For illustrative purposes, it is assumed that the battery system 224 has a voltage of 48V and the stack 206 has 60 fuel cells such that the stack operating voltage is generally over 48 volts. The blower 210 is limited in how fast it can respond to an increase in load 222. For example, a transient load increase may result in oxygen starvation during the response lag period where the blower speed is increased to provide more oxygen. As the stack 206 becomes oxygen starved under electrical load 222, the stack voltage will drop. While the stack voltage is over 48 volts, the stack will provide the current to the load 222. The second diode 226 passively prevents back-flow of current to the battery 224. When the stack voltage reaches 48V, the load 222 is shared by the battery 224 and the stack 206. As the stack voltage is driven lower than 48V (e.g., instantaneously on a transient spike in load 222), the load 222 is supplied entirely by battery 224. At this point, the first diode 220 passively prevents current from flowing to the stack 206.

Figure 3:
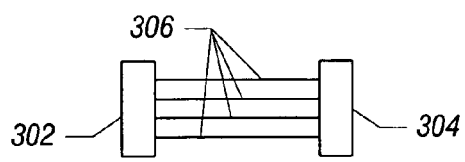
FIG. 3 shows a schematic diagram of a set of non-intersecting fuel cell flow channels.

FIG. 3 shows a schematic diagram of a set of non-intersecting fuel cell flow channels. A cathode inlet 302 and a cathode outlet 304 are in fluid communication via flow channels 306. Each of flow channels 306 connects inlet 302 with outlet 304 without intersecting each other. As previously discussed, the fuel cell cathode flow channels are non-intersecting to prevent any hydrogen that may diffuse or be pumped into the oxygen-starved channel from contacting oxygen still present in another channel in the presence of the fuel cell catalyst, a condition which can potentially damage the fuel cell and cause safety concerns.

It will be appreciated that when a fuel cell is staved of a reactant under electrical load, the cell can be "driven negative", a condition in which the polarity of the cell reverses and the cell becomes an electrical load with respect to other cells in a fuel cell stack. Reactant starvation under such condition can cause electrochemical "pumping" of a reactant across the PEM. If oxygen in a cathode flow channel has been starved under load, then some amount of hydrogen may thus be present in the oxygen-starved cathode channel. Reactant distribution is generally non-uniform across a fuel cell and between the fuel cell reactant flow channels. If an oxygen-starved channel is then intersected with a cathode flow channel that is not oxygen-starved, and the hydrogen and oxygen are mixed in the presence of the fuel cell catalyst, an explosion or fire can occur.

The present invention may also include a controller and control algorithm configured to provide the features and aspects described above. For example, the invention may include a method of operating a fuel cell system including providing an electrical load on a fuel cell through a first diode, providing an excess amount of hydrogen (pure hydrogen, reformate, etc., from a fuel processor, pressure tank, recirculating loop, etc.) to the fuel cell with respect to an amount needed to react to satisfy the electrical load, providing a battery connected to the load in parallel with the fuel cell and through a second diode, and providing oxygen (e.g., air) to the fuel cell in an amount varied according the amount of the load, such that the battery system supplies power to the load when a sudden increase in the load results in momentary oxygen starvation in the fuel cell resulting in the voltage of the fuel cell (or stack) falling to or below the battery voltage. Such method and control algorithm may also represent or include any of the other features and concepts discussed above.

In another aspect, the invention includes a method of operating a fuel cell system, including the following steps: connecting a fuel cell to an electrical load through a first diode adapted to prevent current back-flow to the fuel cell; connecting a battery to the electrical load through a second diode adapted to prevent current back-flow to the battery; providing the fuel cell with a first stoichiometric excess of hydrogen with respect to a stoichiometric hydrogen requirement of the electrical load; and providing the fuel cell with a second stoichiometric excess of oxygen with respect to a stoichiometric oxygen requirement of the electrical load, wherein the second stoichiometric excess of oxygen is less that the first stoichiometric excess of hydrogen.

Further embodiments can include any of the following features and additional steps, either alone or in combination: maintaining an operating temperature of the fuel cell at a temperature in the range 20–100° C.; maintaining an operating temperature of the fuel cell at a temperature in the range 120–200° C.; dead-heading an anode chamber of the fuel cell, and circulating air through the a cathode of the fuel cell; exhausting hydrogen from the fuel cell anode chamber, and recirculating a portion of the exhausted hydrogen to an inlet of the anode chamber; varying a blower output according to a control signal to blow air through a cathode chamber of the fuel cell to provide the second stoichiometric excess of oxygen; measuring a voltage of the fuel cell, and varying the control signal to increase the blower output when the fuel cell voltage falls below a predetermined threshold; and measuring an oxygen content of a cathode exhaust stream, and varying the control signal to increase the blower output when the oxygen content falls below a predetermined threshold.

In another aspect, the invention includes a method of transient load response for a fuel cell system, comprising the following steps: connecting a fuel cell to an electrical load through a first diode adapted to prevent current back-flow to the fuel cell; connecting a battery to the electrical load through a second diode adapted to prevent current back-flow to the battery; providing the fuel cell with an amount of hydrogen, the amount of hydrogen having a first stoichiometric excess over a hydrogen requirement of the electrical load; operating a blower to supply the fuel cell with a flow of oxygen, the amount of oxygen having a second stoichiometric excess over an oxygen requirement of the electrical load; applying a transient load increase to the fuel cell; increasing the flow of oxygen during a response lag period; starving the fuel cell of oxygen during the response lag period; and supplying power from the battery to the electrical load during the response lag period.

As previously discussed, in some embodiments, the fuel cell can comprise a dead-headed anode and a flow-through cathode. Other embodiments may also include any of the following steps, either alone or in combination: exhausting hydrogen from the fuel cell anode chamber, and recirculating a portion of the exhausted hydrogen to an inlet of the anode chamber; measuring a voltage of the fuel cell, and increasing the flow of oxygen during the response lag period when the fuel cell voltage falls below a predetermined threshold; and measuring an oxygen content of a cathode exhaust stream, and increasing the flow of oxygen during the response lag period when the oxygen content falls below a predetermined threshold.

Techniques for building fuel cell systems are well known in the art that can be configured according to the present invention, such that a system under the present invention with the features and aspects described above could be implemented by one of ordinary skill, for example by reference in part to the patents mentioned above.

While the invention has been disclosed with respect to a limited number of embodiments, those skilled in the art, having the benefit of this disclosure, will appreciate numerous modifications and variations therefrom. It is intended that the invention covers all such modifications and variations as fall within the true spirit and scope of the invention.

What is claimed is:

1. A fuel cell system, comprising:
   a fuel cell having an anode chamber and a cathode chamber, wherein the anode chamber is in fluid communication with a hydrogen reservoir, wherein the cathode chamber has an inlet and an outlet;
   wherein the cathode chamber comprises non-intersecting flow channels, the non-intersecting flow channels providing fluid communication between the cathode inlet and outlet;
   the fuel cell having a first connection to an electrical load, the first connection comprising a first diode adapted to prevent current flow to the fuel cell;
   a blower in fluid communication with the cathode inlet, the blower having an electronic connection to a controller, the blower being adapted to vary a flow of oxygen through the cathode chamber according to a control signal received from the controller;
   a battery having a second connection to the electrical load, the second connection being in parallel with the first connection of the fuel cell to the load, the second connection comprising a second diode adapted to prevent current flow to the battery; and
   wherein the controller maintains the flow of oxygen such that an output power capacity of the fuel cell is limited by the amount of oxygen flowed through the fuel cell.

2. The system of claim 1, wherein the fuel cell comprises a polymer electrolyte membrane having an operating temperature in the range 20–100° C.

3. The system of claim 1, wherein the fuel cell comprises a polymer electrolyte membrane having an operating temperature in the range 120–200° C.

4. The system of claim 1, wherein the fuel cell comprises a dead-headed anode and a flow-through cathode.

5. The system of claim 4, wherein the hydrogen reservoir comprises at least 90 wt % hydrogen, and wherein the flow of oxygen comprises air.

6. The system of claim 1, wherein the anode chamber has an inlet and an outlet, and wherein the inlet and outlet are in fluid communication.

7. The system of claim 1, wherein the hydrogen reservoir comprises a pressure regulator valve adapted to maintain a predetermined pressure of the reservoir.

8. A method of operating a fuel cell system, comprising:
connecting a fuel cell to an electrical load through a first diode adapted to prevent current back-flow to the fuel cell;
connecting a battery to the electrical load through a second diode adapted to prevent current back-flow to the battery;
providing the fuel cell with a first stoichiometric excess of hydrogen with respect to a stoichiometric hydrogen requirement of the electrical load; and
providing the fuel cell with a second stoichiometric excess of oxygen with respect to a stoichiometric oxygen requirement of the electrical load, wherein the second stoichiometric excess of oxygen is less that the first stoichiometric excess of hydrogen.

9. The method of claim 8, further comprising:
maintaining an operating temperature of the fuel cell at a temperature in the range 20–100° C.

10. The method of claim 8, further comprising:
maintaining an operating temperature of the fuel cell at a temperature in the range 120–200° C.

11. The method of claim 8, further comprising:
dead-heading an anode chamber of the fuel cell; and
circulating air through the a cathode of the fuel cell.

12. The method of claim 8, further comprising:
exhausting hydrogen from the fuel cell anode chamber; and
recirculating a portion of the exhausted hydrogen to an inlet of the anode chamber.

13. The method of claim 8, further comprising:
varying a blower output according to a control signal to blow air through a cathode chamber of the fuel cell to provide the second stoichiometric excess of oxygen.

14. The method of claim 13, further comprising:
measuring a voltage of the fuel cell; and
varying the control signal to increase the blower output when the fuel cell voltage falls below a predetermined threshold.

15. The method of claim 13, further comprising:
measuring an oxygen content of a cathode exhaust stream; and
varying the control signal to increase the blower output when the oxygen content falls below a predetermined threshold.

16. A method of transient load response for a fuel cell system, comprising:
connecting a fuel cell to an electrical load through a first diode adapted to prevent current back-flow to the fuel cell;
connecting a battery to the electrical load through a second diode adapted to prevent current back-flow to the battery;
providing the fuel cell with an amount of hydrogen, the amount of hydrogen having a first stoichiometric excess over a hydrogen requirement of the electrical load,
operating a blower to supply the fuel cell with a flow of oxygen, the amount of oxygen having a second stoichiometric excess over an oxygen requirement of the electrical load;
applying a transient load increase to the fuel cell;
increasing the flow of oxygen during a response lag period;
starving the fuel cell of oxygen during the response lag period; and
supplying power from the battery to the electrical load during the response lag period.

17. The method of claim 16, wherein the fuel cell comprises a dead-headed anode and a flow-through cathode.

18. The method of claim 16, wherein the fuel cell comprises an anode chamber and a cathode chamber, the method further comprising:
exhausting hydrogen from the fuel cell anode chamber; and
recirculating a portion of the exhausted hydrogen to an inlet of the anode chamber.

19. The method of claim 16, further comprising:
measuring a voltage of the fuel cell; and
increasing the flow of oxygen during the response lag period when the fuel cell voltage falls below a predetermined threshold.

20. The method of claim 16, further comprising:
measuring an oxygen content of a cathode exhaust stream; and
increasing the flow of oxygen during the response lag period when the oxygen content falls below a predetermined threshold.

* * * * *